US008249015B2

(12) United States Patent
Kaur et al.

(10) Patent No.: US 8,249,015 B2
(45) Date of Patent: Aug. 21, 2012

(54) METHOD AND SYSTEM FOR MEDIA INDEPENDENT HANDOVER USING OPERATION, ADMINISTRATION AND MAINTENANCE PROTOCOL

(75) Inventors: Samian Kaur, King of Prussia, PA (US); Ulises Olvera-Hernandez, Kirkland (CA)

(73) Assignee: InterDigital Technology Corporation, Wilmington, DE (US)

( * ) Notice: Subject to any disclaimer, the term of this patent is extended or adjusted under 35 U.S.C. 154(b) by 482 days.

(21) Appl. No.: 11/557,257

(22) Filed: Nov. 7, 2006

(65) Prior Publication Data
US 2007/0183333 A1 Aug. 9, 2007

Related U.S. Application Data

(60) Provisional application No. 60/735,275, filed on Nov. 10, 2005.

(51) Int. Cl.
H04L 12/26 (2006.01)

(52) U.S. Cl. .......... 370/331; 370/236.2; 370/241.1; 370/242; 455/436

(58) Field of Classification Search .......... 370/331, 370/236.2, 241.1, 242; 455/436
See application file for complete search history.

(56) References Cited

U.S. PATENT DOCUMENTS

| 7,003,297 | B2 | 2/2006 | Willars et al. |
| 7,483,984 | B1 | 1/2009 | Jonker et al. |
| 7,496,364 | B2 | 2/2009 | Hoghooghi et al. |
| 7,693,078 | B2 | 4/2010 | Gonda |
| 2003/0152063 | A1* | 8/2003 | Giese et al. ............. 370/349 |
| 2004/0165534 | A1* | 8/2004 | Claseman ............. 370/241.1 |
| 2005/0099949 | A1* | 5/2005 | Mohan et al. ............. 370/236.2 |
| 2005/0249124 | A1* | 11/2005 | Elie-Dit-Cosaque et al. 370/242 |
| 2005/0249161 | A1 | 11/2005 | Carlton |
| 2006/0092864 | A1* | 5/2006 | Gupta et al. ............. 370/278 |
| 2006/0153235 | A1* | 7/2006 | Kiernan et al. ............. 370/469 |
| 2006/0159047 | A1 | 7/2006 | Olvera-Hernandez et al. |

FOREIGN PATENT DOCUMENTS

| KR | 2004-0017440 | 2/2004 |
| KR | 2004-0042281 | 5/2004 |
| WO | 99/22530 | 5/1999 |

(Continued)

OTHER PUBLICATIONS

IEEE Computer Society, "IEEE Standard for Information Technology—Telecommunications and Information Exchange Between Systems—Local and Metropolitan Networks—Specific Requirements, Part 3: Carrier Sense Multiple Access With Collision Detection (CSMA/CD) Access Method and Physical Layer Specifications, Amendment: Media Access Control Parameters, Physical Layers, and Management Parameters for Subscriber Access Networks", IEEE Std 802.3ah—2004 (Sep. 7, 2004).

(Continued)

*Primary Examiner* — Dwayne Bost
*Assistant Examiner* — William F Rideout
(74) *Attorney, Agent, or Firm* — Volpe and Koenig, P.C.

(57) ABSTRACT

A method and system for media independent handover (MIH) using an Ethernet operation, administration and maintenance (OAM) protocol are disclosed. Link connectivity between a user equipment (UE) and an MIH point of service (PoS) is monitored by using an OAM protocol. An OAM trigger indicating a link status is mapped to an MIH event and the MIH event is reported for potential handover. The OAM protocol may be IEEE 802.3ah or 802.1ag.

22 Claims, 3 Drawing Sheets

FOREIGN PATENT DOCUMENTS

| WO | 01/50795 | 7/2001 |
|---|---|---|
| WO | 2006/078630 | 7/2006 |

OTHER PUBLICATIONS

IEEE Computer Society, "IEEE Standard for Local and Metropolitan Area Networks, Virtual Bridged Local Area Networks", IEEE Std 802.1Q™—2005, (May 19, 2006).

IEEE Computer Society, "IEEE Standard for Local and Metropolitan Area Networks, Virtual Bridged Local Area Networks, Amendment 4: Provider Bridges", IEEE Std 802.1ad™—2005, (May 26, 2006).

IEEE Computer Society, "IEEE Standard for Local and Metropolitan Area Networks, Media Access Control (MAC) Bridges", IEEE Std 802.1D™—2004 (Revision of IEEE Std 802.1D—1998), (Jun. 9, 2004).

IEEE Computer Society, "Information Technology—Telecommunications and Information Exchange Between Systems—Local and Metropolitan Area Networks—Specific Requirements—Part 3: Carrier Sense Multiple Access With Collision Detection (CSMA/CD) Access Method and Physical layer Specifications", IEEE Std 802.3™—2005, Section Five: Clause 56-67, Annex 58A-67A, (Dec. 9, 2005).

International Telecommunication Union, "Series Y: Global Information Infrastructure, Internet Protocol Aspects and Next Generation Networks, Internet Protocol Aspects—Operation, Administration and Maintenance, Requirements for OAM Functions in Ethernet-Based Networks and Ethernet Services", ITU-T Telecommunication Standardization Sector of ITU, Y.1730, (Jan. 2004).

LAN MAN Standards Committee of the IEEE Computer Society, "Draft IEEE Standard for Local and Metropolitan Area Networks: Media Independent Handover Services", IEEE P802.21™/D00.01, (Jul. 2005).

LAN MAN Standards Committee of the IEEE Computer Society, "Draft Standard for Local and Metropolitan Area Networks—Virtual Bridged Local Area Networks—Amendment 5: Connectivity Fault Management", IEEE 802.1ag/D4.1, (Aug. 18, 2005).

LAN MAN Standards Committee of the IEEE Computer Society, "Information Technology—Telecommunications and Information Exchange Between Systems—Local and Metropolitan Area Networks—Specific Requirements—Part 11: Wireless LAN Medium Access Control (MAC) and Physical layer (PHY) Specifications", ANSI/IEEE Std 802.11, 1999 Edition (R2003), (Jun. 12, 2003).

LAN/MAN Standards Committee of the IEEE Computer Society, "Supplement to IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, High-Speed Physical Layer in the 5 GHz Band", IEEE Std 802.11a—1999 Edition (R2003) (Supplement to IEEE Std 802.11—1999), (Jun. 12, 2003).

Olvera, "802.3 Triggers Considerations", IEEE P802.21/D01.09, Draft IEEE Standard for Local and Metropolitan Area Networks: Media Independent Handover Services, pp. 1-12, (Sep. 11, 2006).

Williams, "Directions in Media Independent Handover", IEICE Transactions on Fundamentals of Electronics, Communications and Computer Sciences, vol. E88-A, No. 7, pp. 1772-1776, (Jul. 2005).

Gupta et al., "A Generalized Model for Link Layer Triggers", IEEE 802.21, pp. 1-11., (Mar. 1, 2004).

IEEE Computer Society and the IEEE Microwave Theory and Techniques Society, "IEEE Standard for Local and Metropolitan Area Networks, Part 16: Air Interface for Fixed Broadband Wireless Access Systems", IEEE Std 802.16—2004 (Revision of IEEE Std 802.16—2001), (Oct. 1, 2004).

International Telecommunication Union, "Series Y: Global Information Infrastructure, Internet Protocol Aspects and Next Generation Networks, Internet Protocol Aspects—Operation, Administration and Maintenance, Requirements for OAM Functions in Ethernet-Based Networks and Ethernet Services", IRU-T Telecommunication Standardization Sector of ITU, Y.1730, (Jan. 2004).

LAN MAN Standards Committee of the IEEE Computer Society, "Draft IEEE Standard for Local and Metropolitan Area Networks: Media Independent Handover Services," IEEE P802.21/D00.03 (Oct. 2005).

LAN MAN Standards Committee of the IEEE Computer Society, "Information Technology—Telecommunications and Information Exchange Between Systems—Local and Metropolitan Area Networks—Specific Requirements—Part 11: Wireless LAN Medium Access Control (MAC) and Physical layer (PHY) Specifications", ANSI/IEEE Std 802.11, 1999 Edition (R2003), Jun. 12, 2003).

IEEE Computer Society and the IEEE Microwave Theory and Techniques Society,"IEEE Standard for Local and Metropolitan Area Networks, Part 16: Air Interface for Fixed Broadband Wireless Access Systems", IEEE Std 802.16—2004 (Revision of IEEE Std 802.16—2001), (Oct. 1, 2004).

LAN/MAN Standards Committee of the IEEE Computer Society, "Supplement to IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, High-Speed Physical Layer in the 5 GHz Band", IEEE Std 802.11a-1999 Edition (R2003) (Supplement to IEEE Std 802.11-1999), (Jun. 12, 2003).

Satoh, "IT Forefront, Predict Future from IEEE 02 Standardization Trend (Sequel)," Nikkei Byte, No. 269, pp. 18-19 (Sep. 22, 2005).

\* cited by examiner

METHOD AND SYSTEM FOR MEDIA INDEPENDENT HANDOVER USING OPERATION, ADMINISTRATION AND MAINTENANCE PROTOCOL

CROSS REFERENCE TO RELATED APPLICATION

This application claims the benefit of U.S. provisional application No. 60/735,275 filed Nov. 10, 2005, which is incorporated by reference as if fully set forth.

FIELD OF INVENTION

The present invention is related to communication systems. More particularly, the present invention is related to a method and system for media independent handover (MIH) using an Ethernet operation, administration and maintenance (OAM) protocol.

BACKGROUND

IEEE 802.21 provides architecture to enable a seamless handover process based on measurements and triggers supplied from link layers. IEEE 802.21 defines media independent event service (ES), command service (CS) and information service (IS). IEEE 802.21 also defines medium access control (MAC) layer service access points (SAPs) and associated primitives for each specific access technology.

IEEE 802.21 MIH event and information service (EIS) requires MAC or physical layer-based event notification for link status updates between a user equipment (UE) and an MIH point of service (PoS). The MIH EIS events include link up, link down, link parameters change, link going down, service data unit (SDU) transmission status, link event rollback, pre trigger (L2 handoff imminent), and the like. Currently, link layer extensions required to support MIH EIS are under consideration for various technologies.

For Ethernet networks, link monitoring using continuity messages is necessitated where physical layer signaling is inadequate to detect a connectivity status between two communication peers. IEEE 802.3ah Ethernet first mile (EFM) provides an extension to the 802.3 physical layer signaling to facilitate a connectivity status determination. IEEE 802.3ah provides link monitoring, fault signaling and remote loopback. Link monitoring serves for detecting and indicating link faults under a variety of conditions so entities can detect failed and degraded connections. Fault signaling provides mechanisms for one entity to signal another that it has detected an error. Remote loopback, which is often used for troubleshooting, allows one entity to put another entity into a state whereby all inbound traffic is immediately reflected back onto the link.

IEEE 802.1ag, (also known as connectivity fault management (CFM)), specifies protocols, procedures and managed objects to support transport fault management for end to end Ethernet networks at the customer, operator and service provider levels. These allow discovery and verification of the path through bridges and local area networks (LANs) and detection and isolation of connectivity fault to a specific bridge or LAN.

CFM mechanisms for fault detection include continuity check, traceroute, loopback (ping), alarm indication, and the like, at different OAM domains, (e.g., operator domain, provider domain and customer domain). Each maintenance domain carries CFM messages using destination address and EtherType. CFM messages are sourced or received at maintenance end points (MEPs) after traversing zero or more maintenance intermediate points (MIPs). The CFM messages pass transparently through 802.1Q or 802.1ad bridges. Multiple instances of CFM can operate at multiple levels on the same bridge port simultaneously.

Although conventional arts provide a mechanism to detect link problems and provide this information to the link endpoints, there is currently no means to make use of this information for the purpose of triggering handover operation towards an alternative link.

SUMMARY

The present invention is related to a method and system for MIH using an Ethernet OAM protocol. Link connectivity between a UE and an MIH PoS is monitored by using an OAM protocol. An OAM trigger indicating a link status is mapped to an MIH event and the MIH event is reported for potential handover. The OAM protocol may be IEEE 802.3ah or 802.1ag. The access networks may be 802.1D-bridged network or 802.1Q-bridged network.

DETAILED DESCRIPTION OF THE PREFERRED EMBODIMENTS

Hereafter, the terminology "UE" includes but is not limited to a wireless and/or wired transmit/receive unit (TRU), a mobile station (STA), a fixed or mobile subscriber unit, a pager, or any other type of device capable of operating in a wireless and/or wired environment.

The features of the present invention may be incorporated into an integrated circuit (IC) or be configured in a circuit comprising a multitude of interconnecting components.

In accordance with the present invention, MIH endpoints, (i.e., an UE and an MIH PoS), are made as OAM peer entities and a link status between the UE and the MIH PoS is monitored by using an OAM protocol, (such as 802.3ag or 802.1ag). An OAM trigger indicating a detected link status is mapped to an MIH event. The MIH event is reported to higher layers for potential handover. The MIH PoS is a network entity providing MIH services. The MIH PoS may reside in any place in the network. For example, the MIH PoS may reside in a point of attachment (PoA) or in a core network. In accordance with the present invention, the current link status information is made available to an 802.21 PoS with MIH capabilities, and the PoS may use it to trigger a handover towards an alternate link whenever a problem with the current link is reported. The present invention provides a mechanism to generically use the 802.1 link detection mechanism for handover decision over 802.3 and 802.11 networks.

Figure 1:
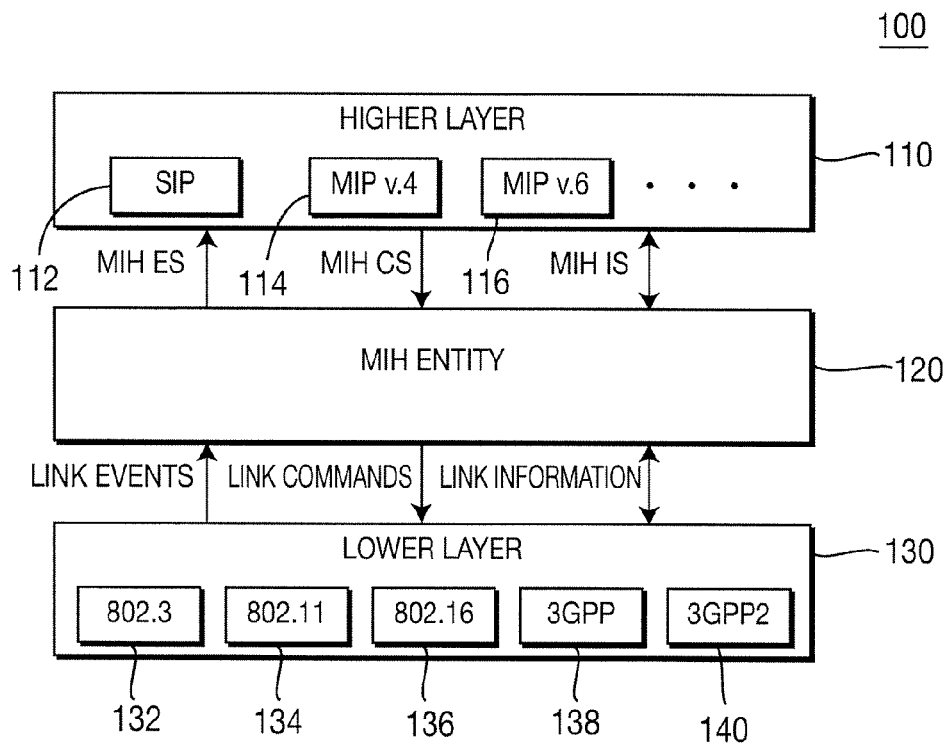
FIG. 1 shows functional entities of a UE in accordance with the present invention.

FIG. 1 shows functional entities of the UE 100 in accordance with the present invention. The UE 100 includes a higher layer 110, an MIH entity 120 and a lower layer 130. The higher layer 110 includes a session initiation protocol (SIP) entity 112, a mobile Internet protocol version 4 (MIP v.4) entity 114, a mobile Internet protocol version 6 (MIP v.6) entity 116, and the like. The lower layer 130, (i.e., layer 2 and layer 1), includes an IEEE 802.3 entity 132, an IEEE 802.11 entity 134, an IEEE 802.16 entity 136, a third generation partnership project (3GPP) entity 138, a 3GPP2 entity 140, and the like. The MIH entity 120 receives link events and link information from the lower layer 130. Based on the reported link events and information from the lower layer 130, the MIH entity 120 generates MIH events and information and sends them to the higher layer 110. The MIH entity 120 receives MIH commands and information from the higher layer 110. Based on the MIH commands and information received from the higher layer 110, the MIH entity 120 generates link commands and link information and sends them to the lower layer 130.

Figure 2:
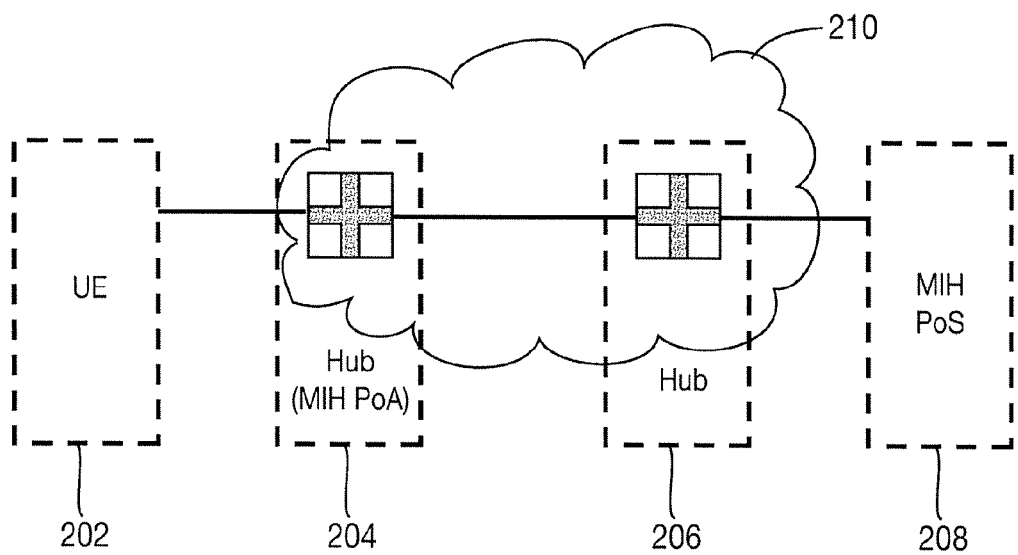
FIG. 2 shows a UE and an MIH PoS monitoring a link status using 802.3ah OAM messages in accordance with the present invention.

FIG. 2 shows a UE 202 and an MIH PoS 208 monitoring a link status using 802.3ah OAM messages in accordance with the present invention. A connection between the UE 202 and the MIH PoS 208 is established via a network 210 including one or more hubs (or repeaters) 204, 206. The first hub (or repeater) 204 is a PoA. When the UE 202 and the MIH PoS 208 are connected through a hub (or repeater) 204, 206, the 802.3 physical layer signaling at the layer 1 interface of the UE 202 is unable to detect the link event change between the hub (or repeater) 204, 206 and the MIH PoS 208. Therefore, the end to end semantics required for a handover decision are lost as loss of connectivity between the hubs (or repeaters) 204, 206 is not visible to either the UE 202 or the MIH PoS 208. It should be noted that the loss of connectivity beyond the MIH PoS 208 is beyond the scope of what can be accomplished by IEEE 802.21.

In accordance with a first embodiment of the present invention, the MIH endpoints, (i.e., the UE 202 and the MIH PoS 208), are made as OAM peer entities and the link status between the UE 202 and the MIH PoS 208 are monitored by using an IEEE 802.3ah protocol. Both the UE 202 and the MIH PoS 208 include an MIH entity. The PoA 204 may include an MIH entity. In such case, the PoA 204 works as an MIH capable PoA. The MIH entities of the UE 202 and the MIH PoS 208, (optionally, an MIH entity of the MIH PoA 204), use this link status information to generate an 802.21 MIH event notification about the link status.

When a link status is detected using an 802.3ah protocol, an OAM trigger is forwarded to the MIH entity of the UE 202 (or the MIH PoS 208 and the MIH PoA 204). The OAM triggers are then mapped to MIH events by the MIH entity of the UE 202 (or the MIH PoS 208 and the MIH PoA 204) and reported to higher layers for triggering a handover.

Table 1 shows mapping of 802.3ah triggers to 802.21 events. Some of the currently defined MIH events can be associated with 802.3ah triggers. The 802.3ah framework allows extension of this subset by a vendor using custom type-length-value (TLV) specification. An 802.3ah link up event indicating that the physical layer has determined that the link is up and the OAM remote entity is up is mapped to an 802.21 link up event. An 802.3ah link fault event indicating that the physical layer has determined a fault has occurred in the receive direction of the local data terminal equipment (DTE) is mapped to an 802.21 link down event. An 802.3ah dying gasp event indicting that an unrecoverable local failure condition has occurred is mapped to an 802.21 link going down event.

TABLE 1

| | 802.3ah Triggers | |
|---|---|---|
| MIH Event | Event | Description |
| Link Up | Link Up | The PHY has determined that the link is up AND the OAM Remote Entity is up. |
| Link Down | Link fault | The PHY has determined a fault has occurred in the receive direction of the local DTE |
| Link Going Down | Dying Gasp | An unrecoverable local failure condition has occurred. |

Figure 3:
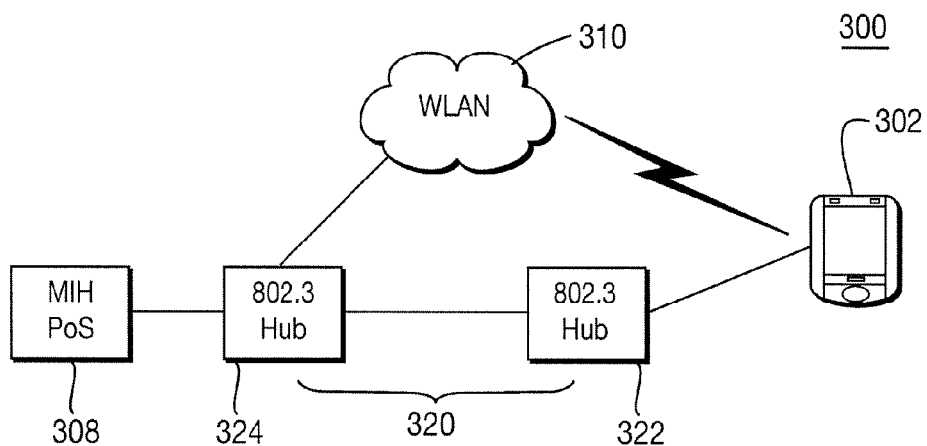
FIG. 3 shows an exemplary system for supporting MIH using 802.3ah OAM messages in accordance with a first embodiment of the present invention.

FIG. 3 shows an exemplary system 300 for supporting MIH services using 802.3ah OAM in accordance with the present invention. The system 300 includes a UE 302, a wireless local area network (WLAN) 310, an 802.3 network 320 and an MIH PoS 330. The 802.3 network 320 includes a plurality of inter-connected hubs (or repeaters) 322, 324. The UE 302 is MIH capable and supports both the WLAN access technology and 802.3 access technology. The UE 302 and the MIH PoS 330 are two OAM peer entities and the link status between the UE 302 and the MIH PoS 330 are monitored by using an IEEE 802.3ah protocol. Upon detection of one of the 802.3ah triggers, an MIH entity of the UE 302 (or the MIH PoS 330) maps the 802.3ah trigger to an 802.21 event. Therefore, MIH communication between the UE 302 and the MIH PoS 308 is established through one of the WLAN 310 and the 802.3 network 320 as shown in FIG. 3. Based on the reported MIH event, a handover may be triggered between the WLAN 310 and the 802.3 network 320.

In accordance with a second embodiment of the present invention, the link status between a UE and an MIH PoS is monitored by using an IEEE 802.1ag protocol. If the UE is connected to the MIH PoS through an 802.1D or 802.1Q-bridged network as shown in FIGS. 4 and 5, an 802.3 layer 1 event notification or 802.3ah OAM messages are insufficient to detect loss of connectivity between the UE and the MIH PoS.

Figure 4:
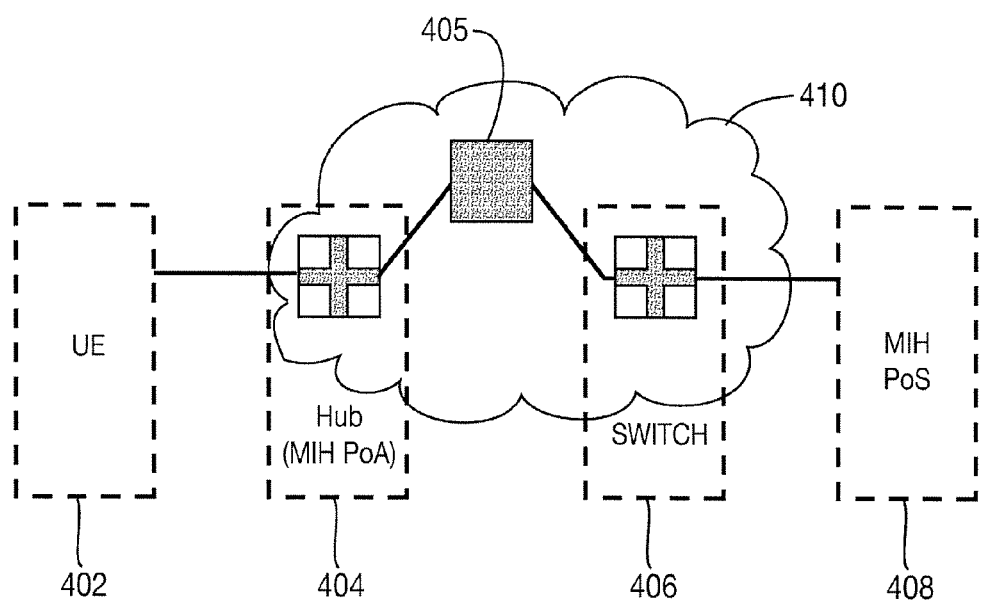
FIG. 4 shows a UE and an MIH PoS connected through an 802.1D-bridged network and monitoring a link status using 802.1ag OAM messages in accordance with the present invention.

FIG. 4 shows an UE 402 and an MIH PoS 408 connected through an 802.1D-bridged network 410 and monitoring a link status using 802.1ag OAM messages in accordance with the present invention. The 802.1D-bridged network 410 includes hubs 404 and bridges/switches 405,406. The connection between the UE 402 to the MIH PoS 408 is established via one or more 802.1D bridges or switches. When the UE 402 and the MIH PoS 408 are connected through an 802.1D-bridged network 410, an 802.3 level physical layer link status notification is insufficient to detect a link connectivity to the MIH PoS 408 and IEEE 802.3ah OAM messages do not traverse 802.1D bridges/switches 405, 406.

Figure 5:
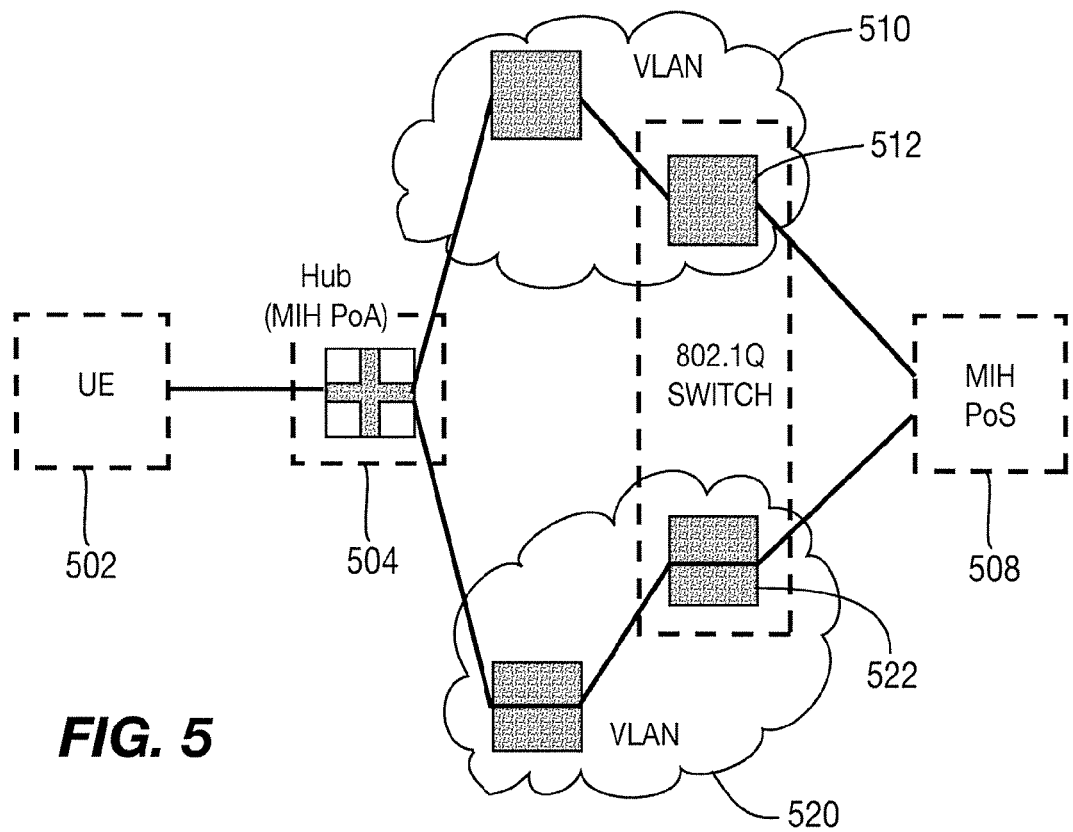
FIG. 5 shows a UE and an MIH PoS connected through an 802.1Q bridged network and monitoring a link status using 802.1ag OAM messages in accordance with the present invention.

FIG. 5 shows an UE 502 and an MIH PoS 508 connected through an 802.1Q bridged network and monitoring a link status using 802.1ag OAM messages in accordance with the present invention. The UE 502 is connected to a hub, (i.e., PoA), 504. The connection between the PoA 504 to the MIH PoS 508 is established via one or more 802.1Q bridges or switches 512, 522. When the bridges or switches 512, 522 are 802.1Q bridges or switches, the reachability to the MIH PoS 508 may be through different links for different virtual local area networks (VLANs) 510, 520, either due to static configuration or through configuration of spanning tree running on each bridge. In such case, the MIH connectivity between the UE 502 and the MIH PoS 508 needs to be established and monitored on a per VLAN identity (ID) basis.

In accordance with the second embodiment of the present invention, the 802.1ag protocol for customer level OAM is used to detect the end to end link status by mapping the 802.1ag management information base (MIB) objects to the 802.21 events. Table 2 shows a mapping of 802.1ag MIB objects to the 802.21 events.

An 802.1ag MIB object indicating that a connectivity is detected or has been restored is mapped to an 802.21 link up event. An 802.1ag MIB object indicating that a management end point (MEP) has lost contact with one or more MEPs is mapped to an 802.21 link down event. A new 802.1ag MIB object is defined to indicate the number of connectivity check frames that can be lost before indicating a fault has occurred to map 802.21 link going down event to 802.1ag dying gasp.

A link going down event is used whenever there is a possibility that a link might fail, (e.g., due to poor radio conditions). Where the current link is supported via 802.3, the link going down status may be flagged when it is determined that the connection would likely be down within a short period of time after looking at the amount of frames that have been lost. For example, if a threshold is set to ten (10) frame losses before the link is deemed faulty, then a link going down indication may be sent on the 9th frame check has failed.

TABLE 2

| MIH event | Object | Present/ Extension | Description |
|---|---|---|---|
| | 802.1ag MIB objects | | |
| Link Up | Dot1agCfmCCheckRestoredEvent | Present | Detected connectivity or connectivity has been restored. |
| Link Down | Dot1agCfgCCheckLossEvent | Present | A MEP has lost contact with one or more MEPs. A notification (fault alarm) is sent to the management entity with the MEPID of the MEP which detected the problem. |
| Link Going Down | X | Extension | Number of connectivity check frames that can be lost before indicating fault is defined. "Link Going Down" signal is generated for one or more less than the count. |

Figure 6:
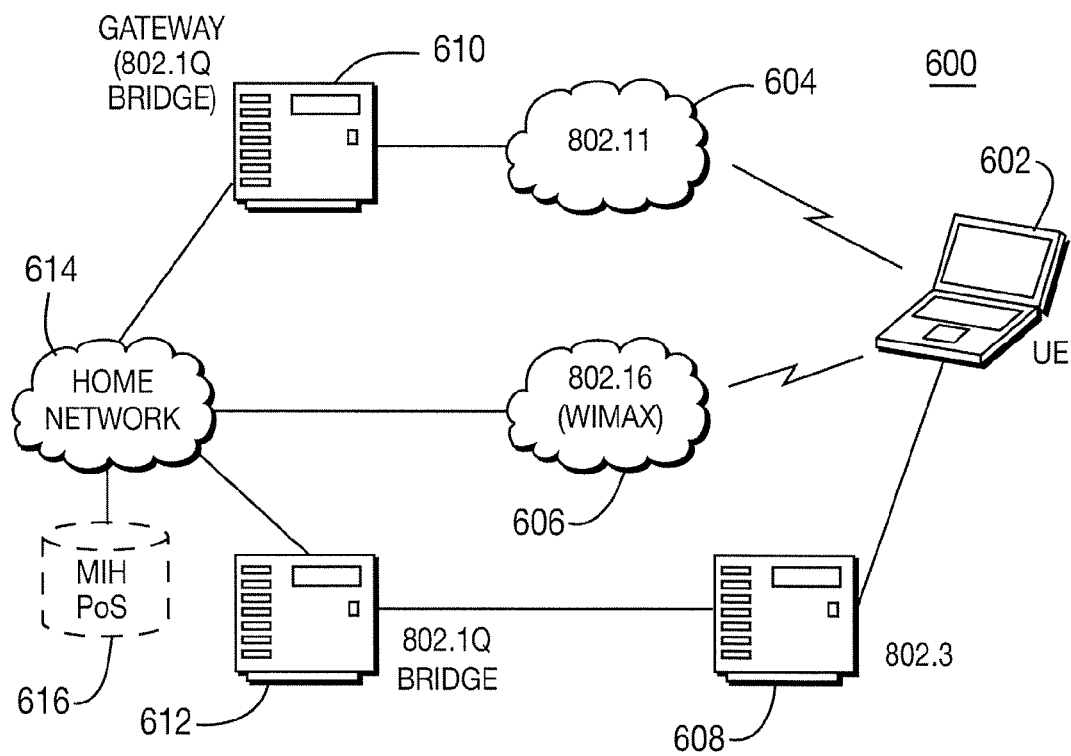
FIG. 6 shows an exemplary system for supporting MIH using 802.1ag OAM messages in accordance with a second embodiment of the present invention.

FIG. 6 shows an exemplary system 600 for supporting MIH services using 802.1ag OAM in accordance with the second embodiment of the present invention. The system 600 includes a UE 602, an 802.11 network 604, an 802.16 network (WIMAX) 606, an 802.3 network 608, a home network 614 and an MIH PoS 616. The 802.11 network 604 and the 802.3 network are connected to the home network 614 via 802.1Q bridges 610, 612, respectively. The UE 602 is MIH capable and supports the 802.11, 802.16 and 802.3 access technologies. The UE 602 and the MIH PoS 616 are two OAM peer entities and the link status between the UE 602 and the MIH PoS 616 are monitored by using an IEEE 802.1ag protocol as stated above. Upon detection of the 802.1ag events, an MIH entity of the UE 602, (or the MIH PoS 616 or PoAs in the 802.11 network 604, the 802.16 network 606 and the 802.3 network 608), maps the 802.1ag MIB object to an 802.21 event and may trigger an inter-technology handover between the 802.11 network 604, the 802.16 network 606 and the 802.3 network 608, or intra-technology handover may be triggered within the currently connected network, based on the MIH event. An IEEE 802.1Q VLAN traffic can be carried over 802.3, 802.11 and 802.16 frames through the associated convergence sublayer. Thus, the end-to-end 802.1ag based connectivity is valuable to make inter-technology or intra-technology handover decisions.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method implemented in a user equipment, the method comprising:
    establishing a link to a Media Independent Handover (MIH) Point of Service (PoS) as an operation, administration, and maintenance (OAM) peer;
    monitoring a link status of the link to the MIH PoS by using an OAM protocol;
    in response to a detection of a change in the link status, mapping an OAM trigger indicating the link status to an MIH event; and
    reporting the MIH event to a higher layer.

2. The method of claim 1 wherein the OAM protocol is IEEE 802.3ah.

3. The method of claim 2 wherein an 802.3ah link up event is mapped to an MIH link up event.

4. The method of claim 2 wherein an 802.3ah link fault event is mapped to an MIH link down event.

5. The method of claim 2 wherein an 802.3ah dying gasp event is mapped to an MIH link going down event.

6. The method of claim 1 wherein the OAM protocol is IEEE 802.1ag.

7. The method of claim 6 wherein an 802.1ag object indicating that a change in link status is detected is mapped to an MIH link up event.

8. The method of claim 6 wherein an 802.1ag object indicating that a management end point (MEP) has lost contact with one or more MEPs is mapped to an MIH link down event.

9. The method of claim 6 wherein an MIH link going down event is generated based on an 802.1ag object indicating the number of connectivity check frames that can be lost before indicating fault.

10. The method of claim 1 wherein the link to the MIH POS is via an 802.1D-bridged network.

11. The method of claim 1 wherein the link to the MIH POS is via an 802.1Q-bridged network.

12. A user equipment comprising:
    a lower layer entity configured to:

establish a link between the UE and a Media Independent Handover (MIH) Point of Service (PoS) as an operation, administration, and maintenance (OAM) peers;

monitor a link status of the link to the MIH PoS by using an OAM protocol; and send an OAM trigger indicating a detected change in the link status; and an MIH entity configured to map the OAM trigger to an MIH event and report the MIH event to a higher layer.

13. The user equipment of claim 12 wherein the OAM protocol is IEEE 802.3ah.

14. The user equipment of claim 13 wherein an 802.3ah link up event is mapped to an MIH link up event.

15. The user equipment of claim 13 wherein an 802.3ah link fault event is mapped to an MIH link down event.

16. The user equipment of claim 13 wherein an 802.3ah dying gasp event is mapped to an MIH link going down event.

17. The user equipment of claim 12 wherein the OAM protocol is IEEE 802.1ag.

18. The user equipment of claim 17 wherein an 802.1ag object indicating that a change in the link status is detected is mapped to an MIH link up event.

19. The user equipment of claim 17 wherein an 802.1ag object indicating that a management end point (MEP) has lost contact with one or more MEPs is mapped to an MIH link down event.

20. The user equipment of claim 17 wherein an MIH link going down event is generated based on an 802.1ag object indicating the number of connectivity check frames that can be lost before indicating fault.

21. The user equipment of claim 12 wherein the link to the MIH POS is via an 802.1D-bridged network.

22. The user equipment of claim 12 wherein the link to the MIH POS is via an 802.1Q-bridged network.

* * * * *

UNITED STATES PATENT AND TRADEMARK OFFICE
CERTIFICATE OF CORRECTION

PATENT NO. : 8,249,015 B2
APPLICATION NO. : 11/557257
DATED : August 21, 2012
INVENTOR(S) : Kaur et al.

Page 1 of 1

It is certified that error appears in the above-identified patent and that said Letters Patent is hereby corrected as shown below:

ON THE TITLE PAGE

Item (56) OTHER PUBLICATIONS, page 2, right column, on the twenty-first line of this section, after "Ethernet Services",", delete "IRU-T" and insert --ITU-T--.

Signed and Sealed this
Ninth Day of April, 2013

Teresa Stanek Rea
*Acting Director of the United States Patent and Trademark Office*